United States Patent

[11] 3,607,324

[72] Inventor Peter E. D. Morgan
 Cherry Hill, N.J.
[21] Appl. No. 768,918
[22] Filed Oct. 18, 1968
[45] Patented Sept. 21, 1971
[73] Assignee General Refractories Company
 Philadelphia, Pa.

[54] METHOD OF MAKING DENSE MAGNESIA-MAGNESIUM CHROMITE SPINEL BODIES
 16 Claims, No Drawings

[52] U.S. Cl.................................................. 106/59,
 106/39 R, 106/66
[51] Int. Cl...................................................... C04b 35/42,
 264 65;66, 252 468
[50] Field of Search............................................. 264/65, 66;
 252/468; 106/39, 59

[56] References Cited
 UNITED STATES PATENTS
 2,538,959  1/1951  Ballard.......................... 106/58
 3,226,456  12/1965  Ryshkewitch et al.......... 106/58

OTHER REFERENCES
 Mellor, Treatise On Inorganic And Theoretical Chemistry Vol. 11, Pages 200, 275. (Sci. Lib. Q.D. 31M.H.).

*Primary Examiner*—James E. Poer
*Attorney*—Howson & Howson

ABSTRACT: Magnesium chromate is heated to thermally decompose the same while held in a confined zone under applied pressure whereby marked densification of the decomposing material occurs to produce dense magnesia/magnesium chromite spinel.

METHOD OF MAKING DENSE MAGNESIA-MAGNESIUM CHROMITE SPINEL BODIES

In my prior application for Letters Patent Ser. No. 538,036, filed Mar. 28, 1966, I have disclosed a process for producing dense oxide bodies by thermally decomposing certain compounds, including hydroxides of magnesium, aluminum and thorium, while held in a confined zone, such as a mold cavity, under pressure (not also U.S. Pat. No. 3,379,523, where certain carbonates, bicarbonates, sulfates, nitrates, clays and talc are mentioned). Information relating to this process, including the treatment of other materials including dolomite, zirconium hydride, thorium oxycarbonate, thorium peroxide and barium titanyl oxalate, is also found in "Chemically Activated Pressure Sintering of Oxides," by P.E.D. Morgan and N. C. Schaeffer, Technical Report AFML-TR-66-356, Nov. 1966, Air Force Materials Laboratory, Research and Technology Division, Air Force Systems Command, Wright-Patterson Air Force Base, Ohio; "The Formation of Fully Dense Oxides by Pressure Calsintering of Hydroxides," by P. E. D. Morgan and E. Scala at pages 861–892 of Sintering and Related Phenomena, Edited by Kuczynski et al., Gordon and Breach, Science Publishers, N.Y. (1967); Amer. Ceram. Soc. Bull., Vol. 44, No. 4, 1965 (page 301).

Refractory systems involving magnesia and chrome are of great interest, for example, in steelmaking installations. Thus, one of the well known refractories used in steelmaking furnaces is prepared by sintering a mixture of magnesia and chrome ore at temperatures in the neighborhood of 1,500° C. or higher.

It is the principal object of the present invention to provide a novel method for making dense bodies of magnesia/magnesium chromite spinel.

It is another object of the invention to provide a method for making dense bodies of fine-grained magnesia/magnesium chromite spinel.

It is a specific object of the invention to provide a method of making dense bodies of substantially pure magnesia/magnesium chromite spinel.

Other objects will become apparent from a consideration of the following specification and claims. The method of the present invention comprises heating a body of magnesium chromate to within its thermal decomposition temperature range to decompose the same to magnesia/magnesium chromite spinel and applying pressure to said body during said decomposition and while said body is held in a confined zone, gases formed during said heating being vented away from said body.

In accordance with a preferred embodiment of the process, the magnesia/magnesium chromite body, after the stated decomposition, is heated to a higher temperature. This further heating may be, and preferably is, conducted with the body still held in the confined zone, while pressure is applied.

It has been found that magnesium chromate ($MgCrO_4$) can be thermally decomposed, under mechanical pressure and while held in a confined zone (mold), at a temperature within the range of from about 500° to about 800° C. to provide a strong, hard, dense, fine grained magnesia/magnesium chromite spinel body in accordance with the equation:

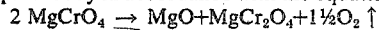
$$2\ MgCrO_4 \rightarrow MgO + MgCr_2O_4 + 1\tfrac{1}{2}O_2 \uparrow$$

The oxygen liberated during the decomposition is readily diffusable out of the shrinking body and can be vented away from the body by conventional means, as by employing a porous mold, such as of graphite, or at least a porous mold lining. The same is the case with any water of crystallization combined with the magnesium chromate which will be driven off during the early heating. The venting of such gases away from the body during the process is of importance in attaining the desired densification.

In connection with the foregoing, magnesium chromate normally has water of crystallization combined therewith, up to 7 mols. It is preferred that at least a portion of this water of crystallization be removed from the magnesium chromate prior to placing the latter in the confined zone so that there is no more than 2 or 3 mols of water of crystallization present.

This at least partial dehydration of the magnesium chromate can be accomplished by preliminarily firing the material to about 250° C. in air.

In carrying out the present method, the magnesium chromate is placed into a confined zone, such as a mold cavity or die, walls of which are adapted to vent evolved gases away from the material. The confined zone may be of any desired size and shaped as long as the mechanical pressure herein specified may be applied. The particle size of the magnesium chromate starting material is not very important since, during decomposition, it will break down, in any event, to very fine particles so that the finely divided mass, under the applied pressure, readily assumes the shape of the confined zone and the applied pressure is transmitted to all portions thereof.

The material is then heated to within its thermal decomposition range, which is from about 550° to about 800° C., or probably more precisely from about 600° to about 750° C. Preferably the material is heated through the range, and, as discussed more fully below, beyond the range.

At least during the time decomposition occurs, mechanical pressure is applied to the body of material in the confined zone to accelerate densification. Of course, the application of pressure may be begun at any time prior to decomposition, even before heating is commenced. The pressure required may depend upon the presence of impurities or the addition of sintering aids and may be as low as about 200 p.s.i. when such impurities and/or sintering aids are present. With relatively pure magnesium chromate, without the addition of sintering aids, the pressure should be at least about 1,000 p.s.i. and preferably at least about 4,000 p.s.i. There is no critical upper limit of pressure, and this may be dictated by the equipment available. There is probably no need, however, to exceed about 20,000 p.s.i.

A particular feature of this decomposition process is that a two-phase system, namely magnesia and magnesium chromite spinel, is produced from the one crystalline precursor. At the temperatures under consideration, the mutual solid solubilities of the two product phases is very low. Consequently, a mutual grain growth inhibition situation is produced. This condition is conducive to rapid densification and bears some similarity to the anomalously high deformation phenomenon observed in 'superplastic' forming.

In accordance with the broader aspects of the invention, the resulting body of magnesia/magnesium chromite spinel may be recovered by removing it from the confined zone, preferably after allowing it to cool. The recovered body may then, if desired, be sintered according to conventional sintering techniques as by heating in an oven or in the original confined zone after release of pressure to a temperature above about 800° C. and up to about 1,200° C. Preferably, however, heating of the body, while still in the confined zone and under an applied pressure is continued to a higher temperature which may go up to about 1,200° C. The final temperature necessary for full densification of the body will be related to the degree of densification achieved during the decomposition stage which, in turn, is dependent upon the pressure applied. In general, therefore, the final temperature will be lowered as the pressure used in the decomposition stage increases. This final activated hot-pressing stage materially increases the density of the product, and in this way a density at or near the maximum theoretical density for $MgO/MgCr_2O_4$ spinel, 4.24 g./cc., can be achieved.

It will be obvious that minor amounts of other materials, such as fillers, reinforcing agents, and the like, may be mixed with the magnesium chromate.

The following specific example is given for the purpose of illustrating the present invention and is not to be considered as limiting the scope of the invention in any way.

EXAMPLE

Analytical grade magnesium chromate power ($MgCrO_4 \cdot H_2O$) is packed into a cylindrical, open-ended graphite mold cavity, having a diameter of three-fourths inch, to a height of 1 inch. A graphite plunger is inserted in the open end of the mold cavity, and the assembly is placed in an electrical heated, hydraulic press. The material is heated at the rate of 5° C./min. from room temperature to about 1,200° C. and a pressure of 4,000 p.s.i. is applied. Vaporized water of crystallization evolved at up to about 400° C. and oxygen evolved in the range of about 600°–750° C., pass off through the pores of the graphite mold. Upon cooling the magnesia/magnesium chromite spinel body and removing it from the mold, it was found to have a density of 4.24 g./cc., the maximum density for $MgO/MgCr_2O_4$ in equimolar proportions, and a grain size of about 1 micron.

Densification was found to occur in two stages. The first, between about 600° and 750° C., clearly corresponded with the decomposition of magnesium chromate and the evolution of oxygen. The second, final, stage of densification occurred rapidly between 900° and 1,200° C.

Modification is possible in the nature of the particular materials and apparatus employed as well as in the particular techniques followed without departing from the scope of the invention.

I claim:

1. The method of making a dense, fine-grained magnesia/magnesium chromite spinel body which comprises heating a body of magnesium chromate to a temperature within its decomposition temperature range to decompose the same to magnesia/magnesium chromite spinel and applying mechanical pressure of at least 200 p.s.i. to said body during said decomposition and while said body is held in a confined zone, gasses formed during said heating being vented away from said body.

2. The method of claim 1 wherein said temperature to which said body of magnesium chromate is heated while decomposing under pressure is from about 550° to about 800° C.

3. The method of claim 2 wherein said temperature to which said body of magnesium chromate is heated while decomposing under pressure is from about 600° to about 750° C.

4. The method of claim 1 wherein, after said decomposition, said body is heated to above said thermal decomposition temperature range further to densify said magnesia/magnesium chromite spinel body.

5. The method of claim 4 wherein, after said decomposition, said body is heated to a temperature up to about 1,200° C.

6. The method of claim 4 wherein, during said further heating of said body to above said thermal decomposition temperature range, pressure is applied to said body while said body is held in a confined zone.

7. The method of claim 1 wherein said pressure is at least about 1,000 p.s.i.

8. The method of claim 7 wherein said pressure is at least about 4,000 p.s.i.

9. The method of claim 6 wherein said pressure is at least about 200 p.s.i.

10. The method of claim 9 wherein said pressure is at least about 1,000 p.s.i.

11. The method of claim 10 wherein said pressure is at least about 4,000 p.s.i.

12. The method of claim 1 wherein said magnesium chromate contains no more than 3 mols of water of crystallization.

13. The method of claim 12 wherein said magnesium chromate contains no more than 1 mole of water of crystallization.

14. The method of claim 1, wherein magnesium chromate containing water of crystallization is preliminarily at least partially dehydrated; wherein said at least partially dehydrated magnesium chromate is placed in a mold cavity and wherein the body of magnesium chromate while in said mold cavity is heated to a temperature of from about 600° to about 750° C. to effect said decomposition.

15. The method of claim 14 wherein, after said decomposition, said body of magnesia/magnesium chromite spinel is heated to a temperature above 750° C. while in said mold cavity.

16. The method of claim 15 wherein pressure is applied to said body of magnesia/magnesium chromite spinel while heating to a temperature above 750° C.